June 7, 1949.  E. J. MALONE  2,472,303
METHOD OF GROWING CRYSTALS
Filed June 10, 1946  2 Sheets-Sheet 1

INVENTOR.
EDWARD J. MALONE
BY
ATTORNEY

Patented June 7, 1949

2,472,303

UNITED STATES PATENT OFFICE 2,472,303

METHOD OF GROWING CRYSTALS

Edward J. Malone, Maple Heights, Ohio, assignor to The Brush Development Company, Cleveland, Ohio, a corporation of Ohio Application June 10, 1946, Serial No. 675,533

3 Claims. (Cl. 171—327)

The invention relates to a method of growing crystals from salt solutions for piezo-electric and other economic uses.

Prior to the development of the present method the growth of crystals for commercial uses, such for example as the production of piezo-electric devices, has been carried out by methods in which seed bodies of simple geometrical form are cut with suitable orientation from previously grown crystals, planted in a solution of the salt to be crystallized and subjected to movement of the solution and a gradual lowering of its temperature. The United States patent to Kjellgren Reissue No. 19,697 presents a detailed disclosure of such a method in which seed bodies of crystalline material are planted in the growing solution and the solution container, mounted on a pivotal support, is rocked to cause the solution to flow back and forth in relation to the seed bodies while the temperature of the solution is progressively lowered at a suitable rate to effect the desired crystallization on the seed bodies until crystals of desired size are formed. In this manner large clear crystals can be produced suitable for subdivision and use.

In such crystal growing a substantial amount of time is consumed, the period of growth in some cases running to many weeks. Also, in the prior practice, there is a waste of time, labor and plant capacity due to the formation of imperfect crystals which are not fit for use and must be discarded and redissolved for use in a later planting. This waste is quite large in the case of some kinds of crystals, especially those having natural crystal forms differing very considerably from the simple geometrical form of the seed bodies with which growth is started. Apparently in those cases the change, during growth, from the simple to the more complex form is more likely to result in unsound crystal growth. Crystals of the so-called P-type group, namely, primary ammonium phosphate ($NH_4H_2PO_4$) and all other crystalline materials isomorphic with it, are examples of crystals less likely to grow in sound form from the seed bodies. Rochelle salt, on the other hand, may be taken as typical of materials that more readily form sound crystals of characteristic form from simple seed bodies.

A principal object of the present invention is to provide a method by means of which the output of a crystal-growing plant of given size can be largely increased and the production cost per unit of output correspondingly reduced.

Further objects of the invention ancillary to that stated above are to increase the amount of useful crystal growth from a given volume of solution in a given time and to reduce correspondingly loss of time, labor and plant capacity incident to growth of defective crystals.

Still another object of the invention is to provide a crystal-growing method that is flexible in its nature and thus better adapted for use under various conditions and to serve various ends, with resultant economies.

With the above objects in view the invention consists in a multiple (and preferably dual) stage procedure which preferably includes the provision of seed bodies of relatively simple geometrical form cut from previously formed crystals of the material to be crystallized, planting of the seed bodies in a solution of the said material, causing a flow of the solution relative to the said bodies and a progressive lowering of the temperature of the solution for an optimum period of time to cause growth of the seed bodies of simple form to a more complex crystal form typical of the material in solution, picking the seed crystals so grown, discarding those crystals which are unsound and uncertain on further growth of producing sound or economically useful crystals, and replanting the sound seed crystals for further growth to desired size for subdivision.

In carrying out the invention use may be made of the fundamental principles disclosed in the above mentioned patent to Kjellgren Reissue No. 19,697.

To further explain the new method and the advantages flowing from its use its application to the production of crystals of primary ammonium phosphate will now be described, reference being had in the description to the accompanying drawings.

Figure 1:
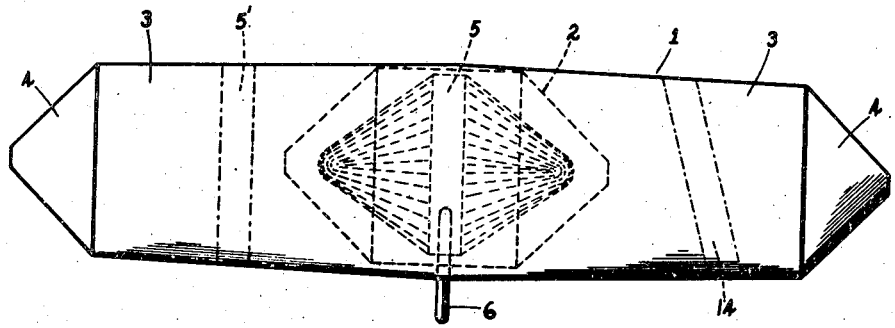
Fig. 1 is a side elevation of a primary ammonium phosphate crystal as grown by the present method.
Figure 2:
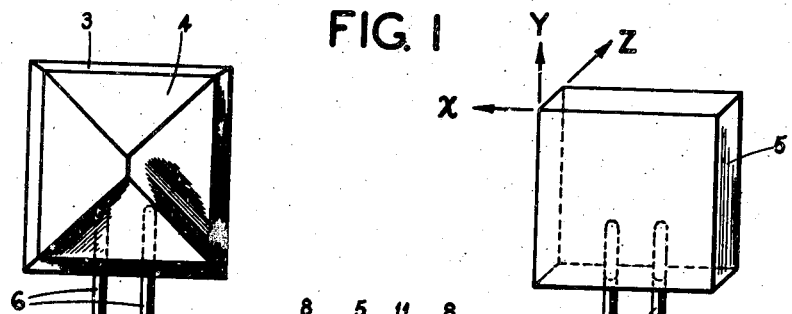
Fig. 2 is an end elevation of the crystal shown in Fig. 1.
Figure 3:
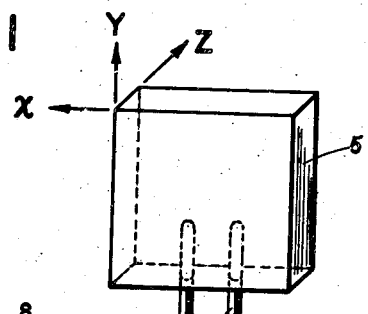
Fig. 3 is an isomeric view of an artificially formed crystal seed body in the form of a square plate used to start the growth of a seed crystal which in turn is used to grow the crystal shown in Fig. 1.

The crystal shown in Fig. 1 and designated as an entirety by the numeral 1, consists of a seed crystal 2, prism sections 3, 3 and pyramidal end sections 4, 4. In the production of a crystal such as shown in Fig. 1 by prior methods a seed plate 5 (Figs. 3 and 4) is cut from a previously grown crystal (as at 5' in Fig. 1) with the orientation indicated in Fig. 3 by the arrows X, Y, Z representing the conventional orthogonal system of axes X, Y, Z with the Z axis parallel to the longitudinal symmetry axis and also the optic axis of the P-type crystalline material. Holes are drilled in one of the narrower faces of plate 5 to permit attachment of supporting pins 6 which may have their projecting ends inserted in holes in a support attached to the bottom of the tray in which the crystal is to be grown. In practice a plurality of such seed plates are disposed in a solution tray which is mounted to be tipped or rocked back and forth on a fixed axis to cause a back-and-forth flow of solution relative to the seed plates as disclosed in the Kjellgren patent Reissue No. 19,697. As shown in Fig. 5 of the accompanying drawings a solution tray 7 is planted with twenty-four of the plates 5 disposed so that the back-and-forth solution flow indicated by the arrows at the right of the tray will be parallel to the Z axis of the plates.

The seed plates having been arranged as specified in the tray, the latter is filled to a suitable level with a hot water solution of the primary ammonium phosphate salt. A suitable solution may be prepared by dissolving the salt in hot water until the solution is saturated at a temperature that will be suitable for starting the crystal growth so that the growth to seed crystal stage, effected by gradual lowering of the solution temperature, will be reached when the temperature has been lowered about to normal room temperature. A saturation temperature of about 36° C. is suitable, and the pH of the solution is preferably adjusted within the range of 3.8 to 4.2. Preferably the saturated solution is heated two or three degrees above the saturation temperature, say to 38° C., and at the higher temperature is poured into the prepared tray preheated to receive it. The tray is thereupon tightly covered to exclude dust and prevent evaporation of the solution. The effect of the hot solution is to dissolve a little of the superficial material of the planted seed plates so that the growth to be carried out may be started on fresh, clean surfaces and with the solution free from potential centers of spurious crystallization.

Suitable automatic temperature control of the solution to effect the crystal growth may be had by housing the trays in an air-conditioned chamber and varying the temperature of the air circulated through the chamber.

Figure 8:
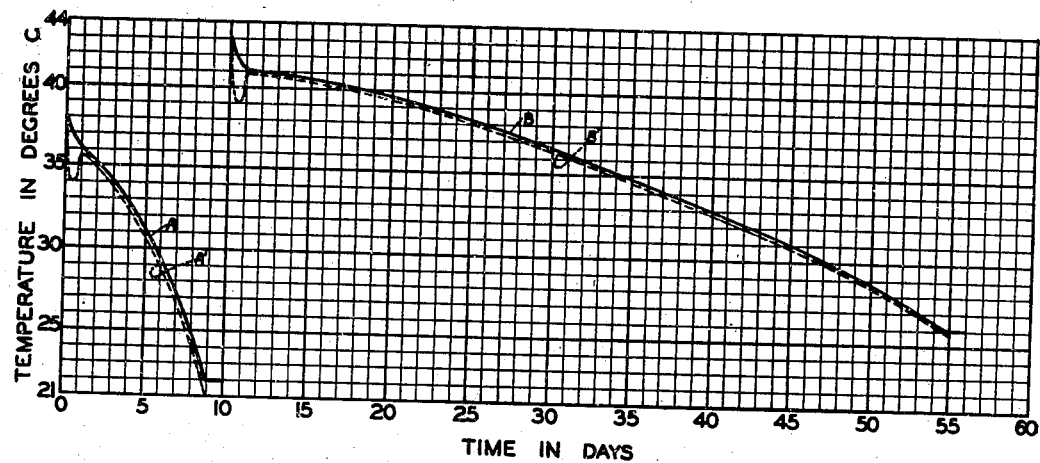
Fig. 8 is a crystal-growing chart showing the temperature control of the salt solution throughout the dual stages period of growth in accordance with the present invention.

In Fig. 8 of the drawings the curve A represents a temperature control suitable for the growth of 24 seed crystals of 1.5" x 1.5" cross-sectional size and is produced by plotting temperature of the solution and time in days as vertical and horizontal coordinates, respectively. Curve A' represents corresponding air temperatures, which naturally differ somewhat from the solution temperatures. Starting with the air at a temperature of 38° C. its temperature is dropped rapidly for several hours to reduce the superheated solution to its saturation temperature and then raised somewhat to a temperature a little below the solution temperature. Thereafter on the second and succeeding days the air temperature is lowered progressively to effect the gradual lowering of the solution temperature, the differential between the solution and air temperatures depending on the volume of solution, rate of temperature reduction, insulation of the chamber walls, etc. Meanwhile the solution is rocked back and forth to facilitate the crystal growth. By gradually lowering the temperature of the solution as indicated by curve A in Fig. 8 while rocking the tray as described crystalline growth to produce seed crystals 2 in accordance with the primary ammonium phosphate crystal habit can be completed and the crystal crop picked, all in a ten days period. Of this period the first day may be consumed in planting the seed plates and adjusting the temperature of the solution to the predetermined value corresponding to saturation. The next eight days may be consumed in cooling to effect crystallization and the tenth day in picking the seed crystals and preparing another solution for the next crystallization of seed crystals.

Figure 4:
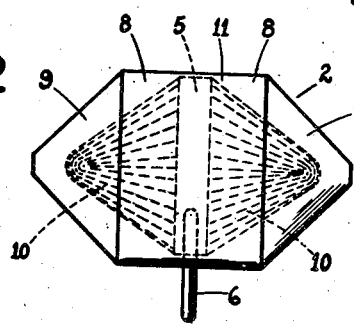
Fig. 4 is a side elevation of the seed crystal referred to in connection with Fig. 3.
Figure 5:
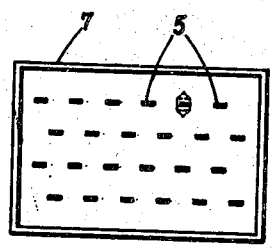
Fig. 5 is a diagrammatic plan view on a greatly reduced scale of a crystal-growing tray or container planted, in accordance with the present invention, with seed plates such as shown in Fig. 3.

On reference to Fig. 4 it will be noted that the seed crystal 2 is made up of the seed plate 5, short prism sections 8, 8 and pyramidal end sections 9, 9. The crystalline growth which produces seed crystal 2, in accordance with the P-type crystal habit, is very much less laterally, i. e. in the directions of the X, Y axes, than in the direction of the Z axis. The latter growth, building up on the major faces of the seed plate 5, tends to be unsound or mushy (as indicated at 10) except near the peripheries of the seed plate. In these peripheral regions, as at 11 in Fig. 4, the growth is clear and sound; and under the influence of the specified back-and-forth flow of the solution this sound growth develops inwardly toward the longitudinal axis of the crystal and, under optimum conditions, forms a solid crystal shell of pyramidal shape as indicated in Fig. 4.

Experience has shown that crystals which do not complete a sound pyramidal shell growth in the eight days period would be at least uncertain of doing so if the growth were continued. Accordingly at the end of eight days of growth the crystals are picked from the tray, inspected and sorted to eliminate crystals judged uncertain of developing sound growth structure. P-type crystals are divided into three grades, the first grade including those which have formed sound pyramidal shells at both ends of the crystal, the second grade including those which have formed such sound shell growth at one end only of the crystal, while the third grade includes the remaining crystals which have not formed sound growth at either end. The great majority of P-type crystals produced in the manner described above are of the third grade.

Figure 6:
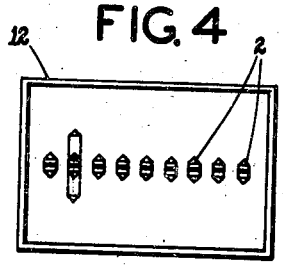
Fig. 6 is a similar view of a tray planted with seed crystals in accordance with the present invention.

Having effected the classification of the seed crystals, those of the first and second grades are replanted in a growing tray with spacing suitable to permit full growth of the crystals to desired size and to suitably accommodate back-and-forth flow of the solution. Such replanting is shown in Fig. 6 where a tray 12 is planted with nine seed crystals. As before, the crystals are oriented so that back-and-forth flow of the solution will be parallel to the Z axes of the crystals. Starting with a suitable hot salt solution in the tray 12 as in the first stage, a second growing stage is carried out by gradually lowering the temperature of the solution while rocking the tray to effect growth of the crystal to a state such as is illustrated in Fig. 1 of the drawing and by dotted lines in Fig. 6 in the case of one of the crystals. The temperatures of the solution and the air in the second growth stage are represented in Fig. 8 by curves B and B', respectively. Since a greater growth is required to produce the elongated full size crystals such as shown in Fig. 1 than is required for the production of seed crystals 2 the growth in the tray 12 is started with a saturated solution at a correspondingly higher solution temperature such as 41° C. and this is gradually lowered from day to day as indicated by curve B so that the temperature of the solution will not fall low enough to require excessive refrigeration. Since the second growth stage is started with seed crystals having sound crystal structure at at least one end and a 100% yield of sound crystalline growth based on such sound structure can be realized with suitable temperature control, the yield of sound crystalline growth attained with the new method is enormously increased in the case of crystals such as those of the P-type, in comparison with the yields realized by prior practice in which no sound growth was attained by the great majority of crystals.

Figure 7:
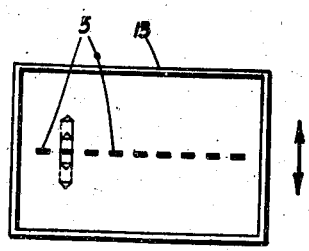
Fig. 7 is a similar view of a tray planted with seed plates in accordance with prior practice.
Figure 9:
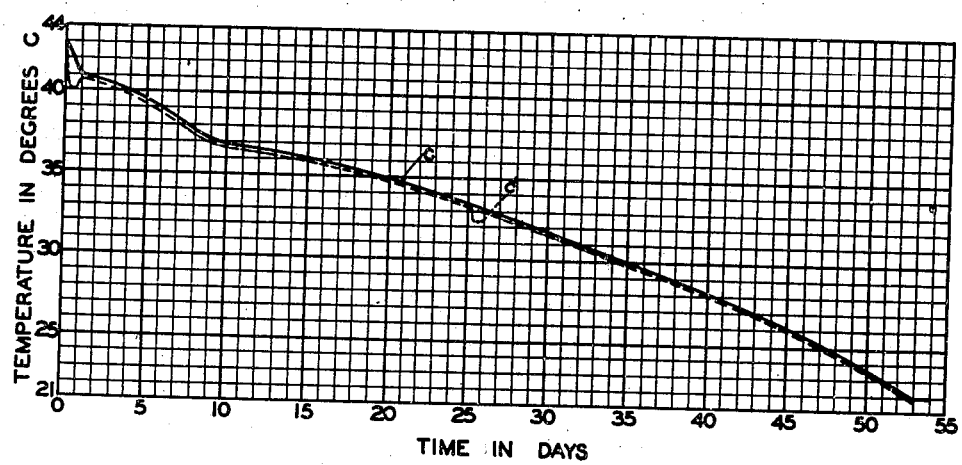
Fig. 9 is a similar chart representing prior practice.

The significance of the result secured by the present method can better be appreciated on specific comparison with the procedure and results of the prior practice. The prior practice in the case of P-type crystals was to plant cut seed elements such as plates 5 in the manner indicated in Fig. 7 of the drawing where the tray 13 is planted with a single row of nine plates to provide the necessary space to accommodate growth to the full crystal size corresponding to Fig. 1. The growth was then started in the manner described for the first growth stage of the present method (except that the growth was started at a higher solution temperature such as 41° C.) and the growth carried out by gradual lowering of the temperature, the planting, growing and picking of the crop consuming an overall period of about 55 days to grow the crystals to the full size shown in Fig. 1. A typical procedure under the prior practice is indicated in Fig. 9 by curves C and C' representing solution and air temperatures, respectively.

The primary significance of the difference between the prior single stage practice and that of the present method resides in the relatively large proportion of unsound crystals produced from the seed plates 5. As has been stated the majority of the seed crystals in the case of P-type crystalline material turn out to be of the third grade. More specifically, in the case of primary ammonium phosphate on the average about 2% of the seed crystals have been of first grade and about 8% of second grade. As the second grade crystals have only one end sound the sound material realized from the first and second grades totalled about 6%. Hence in the prior practice, represented by the planting of Fig. 7 and the growing curve C of Fig. 9, about 94% of the entire crystal growth and corresponding proportions of the crystal-growing plant and of the labor incident to the growth are wholly wasted—an efficiency so low as to very seriously limit economic utilization of crystals such as the P-type.

The advantages of the present multiple stage method are notable. First, as to yield, the segregation and discarding of unsound seed crystals in an early stage of the complete growing cycle and replanting of the wholly sound and half sound ones insures a second stage crop of useable crystalline material amounting to 60% of the maximum that might be secured starting with all seed crystals perfectly formed. In comparison with this the prior method realized for that part of the growth corresponding to the second stage of the present method a useful crystal growth amounting to only 6% of the same maximum.

The comparison is striking also in practical terms of plant capacity. If it is assumed that a plant has 100 trays available for growing primary ammonium phosphate crystals and each tray is capable of growing 9 full size bar crystals, then the capacity of the plant under the prior practice will be 900 crystals per growing cycle. The yield of useable crystals will be 10% or 90 bars. With the growing cycle of 54 days shown in Fig. 9 the production rate will be 1.66 first and second grade crystals per day for 100 trays.

By the present method, a part of the 100 trays will be devoted to growing seed crystals and the remainder to growing the full size bar crystals from the seed crystals. Each tray will accommodate 24 seed crystals and with a yield of 10% the production is 2.4 of first and second grade seed crystals per tray. The growing cycle for the seed crystals being 10 days, the production rate is .24 seed crystals per tray per day, or 10.8 seed crystals per tray in the 45 days of the bar crystal cycle. At this rate 46 trays will produce 497 seed crystals per 45 days as compared with 9×54 or 486 full size bars which can be grown in the remaining 54 trays in the same period. This latter production is at the rate of 10.8 first and second grade bars per day for 100 trays which compares with 1.66 bars per day under the prior practice, or an increase of approximately 550% secured by the present method.

A further advantage of the improved method lies in its greater flexibility, both technically and practically, arising from the division of the crystallization into two stages. Thus it has been discovered by Bengt Kjellgren that an orientation of the seed plate in relation to the relative movement of the salt solution different from that suitable for development of a seed crystal to elongated bar form, increases both the rate of growth and the number of first grade seed crystals produced. Kjellgren has also discovered that presence in the seed-growing solution of certain addition substances produces higher yields of useable seed crystals. These substances would not be permissible in crystalline materials for some of their important uses and hence cannot be used in the prior growing practice where the growth is completely carried out in the same solution. The same is true of impurities generally. In the present multiple stage method the orientation of the seed plate in the first stage is entirely independent of that in the second stage and also the addition substances can be used and impurities can be present in the solution for growing the seed crystals if the latter are transplanted to a solution free from the addition substances and impurities for growth of the crystal material to be utilized for particular purposes. These practices are fully described in Kjellgren application Serial No. 681,505, filed July 5, 1946, now Patent No. 2,468,761.

It will be appreciated, too, that the present multiple stage process makes possible the efficient commercial production and sale of grown seed crystals as a new article of manufacture.

While the seed bodies for growing P-type crystals preferably are cut with major faces at right angles to the Z axis of the crystal the said faces may be disposed at other transverse angles to the Z axis in the practice of the invention, as is indicated, for example, at 14 in Fig. 1.

From the nature of the distinguishing characteristics and advantages of the present method it will be apparent that it is not limited to P-type crystals but can be used to grow many and probably all types that are suitable for commercial use. However, the advantages of the method are not so fully realized in growing some crystals as in growing the P-type crystals. This is due to the fact that the percentage of imperfect crystals grown by the prior single stage method is lower for some crystals than for the P-type crystals. Rochelle salt crystals are an example of this.

As will be apparent from the drawings of the Kjellgren Reissue Patent No. 19,697, showing the growth of Rochelle salt crystals, the cut seed elements do not differ so much in form from the habitual crystal form of the Rochelle salt as do the seed plates 5 from the habitual crystal form of the seed crystal 2 of the P-type crystal. For this reason, it is believed, the habitual crystal form more readily develops from the cut seed element in the case of Rochelle salt than in the case of the P-type salts.

Notwithstanding this difference, Rochelle salt crystals can be grown by the present dual stage method at a substantially lower overall cost than by the single stage procedure of the above noted Kjellgren reissue patent; for, while the gains incident to the second growing stage are less for Rochelle salt crystals than for the P-type crystals, the gains realized in the first stage are equally great for both crystals because each growing tray will accommodate many more cut seed elements for growth to the seed crystal size than for growth to the full size for economic use. Hence the overall advantages of the present method even for crystals such as Rochelle salt are quite substantial.

In the growth of Rochelle salt crystals by the present method the disclosure of the Kjellgren Reissue Patent No. 19,697 may be availed of in the preparation of solutions and cut seed elements, in the orientation of the seed elements and seed crystals, etc., and it is believed that the procedure in applying the present multiple stage method will readily be apparent from the foregoing description without further elaboration.

Since the invention is applicable, with realization of its advantages to a substantial and useful degree, to the growth of all crystals, the foregoing description of the growth of P-type and Rochelle salt crystals is to be taken as exemplary only and not limiting.

What is claimed is:

1. A method of growing crystals which comprises the steps of providing seed bodies cut from crystals of the material to be crystallized; planting the seed bodies in a solution of the said material; causing a flow of the solution relative to the seed bodies and meanwhile progressively lowering the temperature of the solution until growth of at least some of the seed bodies to a superficially sound crystal form typical of the material in solution is effected; picking from the solution all of the seed crystals so grown; segregating such of said seed crystals as are superficially unsound and uncertain on further growth of producing sound or economically useful crystal material; replanting the remaining superficially sound seed crystals in solution of the material to be crystallized; and effecting further growth of the replanted crystals to desired size.

2. A method of growing P-type crystals which comprises the steps of providing plate-shaped seed bodies cut from crystals of the material to be crystallized with the faces of the plates disposed transverse to the Z axis of the crystal; planting the seed bodies in a solution of the said material; causing a flow of the solution relative to the seed bodies and meanwhile progressively lowering the temperature of the solution until growth of at least some of the seed bodies to a superficially sound form typical of the material in solution is effected; picking from the solution all of the seed crystals so grown; segregating such of said seed crystals as are superficially unsound and uncertain on further growth of producing sound or economically useful crystal material; replanting the remaining superficially sound seed crystals in a solution of the material to be crystallized; causing a flow of the solution parallel to the Z axes of the replanted crystals and meanwhile progressively lowering the temperature of the solution to effect further growth of the crystals to desired size.

3. A method of growing P-type crystals as claimed in claim 2 in which the seed bodies are plate-shaped with their major faces disposed at right angles to the Z axis of the crystal.

EDWARD J. MALONE.

REFERENCES CITED

The following references are of record in the file of this patent:

UNITED STATES PATENTS

| Number | Name | Date |
|---|---|---|
| 1,347,350 | Moore | July 20, 1920 |
| 1,353,571 | Dreibradt | Sept. 21, 1920 |
| 1,958,014 | Nicolson | May 8, 1934 |